United States Patent [19]
Sasaki et al.

[11] Patent Number: 5,937,639
[45] Date of Patent: Aug. 17, 1999

[54] INTERNAL COMBUSTION ENGINE

[75] Inventors: Shizuo Sasaki, Numazu; Takekazu Ito, Susono, both of Japan

[73] Assignee: Toyota Jidosha Kabushiki Kaisha, Toyota, Japan

[21] Appl. No.: 09/076,787

[22] Filed: May 13, 1998

[30] Foreign Application Priority Data

May 21, 1997 [JP] Japan ..................................... 9-131327
Nov. 7, 1997 [JP] Japan ..................................... 9-305850

[51] Int. Cl.⁶ .................................................. F02M 25/06
[52] U.S. Cl. ................................ 60/278; 60/276; 60/285; 60/286
[58] Field of Search .............................. 60/276, 278, 285, 60/298, 301

[56] References Cited

U.S. PATENT DOCUMENTS

| | | |
|---|---|---|
| 4,142,493 | 3/1979 | Schira et al. . |
| 4,454,854 | 6/1984 | Gotoh et al. . |
| 5,172,550 | 12/1992 | Takeshima ................................ 60/278 |
| 5,482,020 | 1/1996 | Shimizu et al. ........................ 123/417 |
| 5,632,144 | 5/1997 | Isobe ......................................... 60/277 |
| 5,732,554 | 3/1998 | Sasaki et al. ............................. 60/278 |

*Primary Examiner*—F. Daniel Lopez
*Assistant Examiner*—Binh Tran
*Attorney, Agent, or Firm*—Oliff & Berridge, PLC

[57] ABSTRACT

An internal combustion engine comprising an exhaust gas recirculation system, wherein the amount of EGR gas in the combustion chamber is made larger than the amount of EGR gas where the amount of soot produced peaks when the engine load is comparatively low so as to suppress the temperatures of the fuel and gas around the fuel at the time of combustion in the combustion chamber to a temperature lower than the temperature at which soot is produced. This prevents the production of soot and NOx in the combustion chamber.

21 Claims, 15 Drawing Sheets

Fig.4
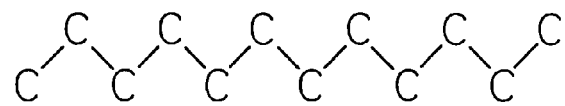
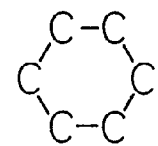 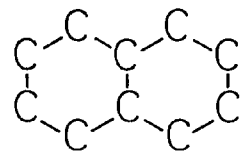
Fig.5
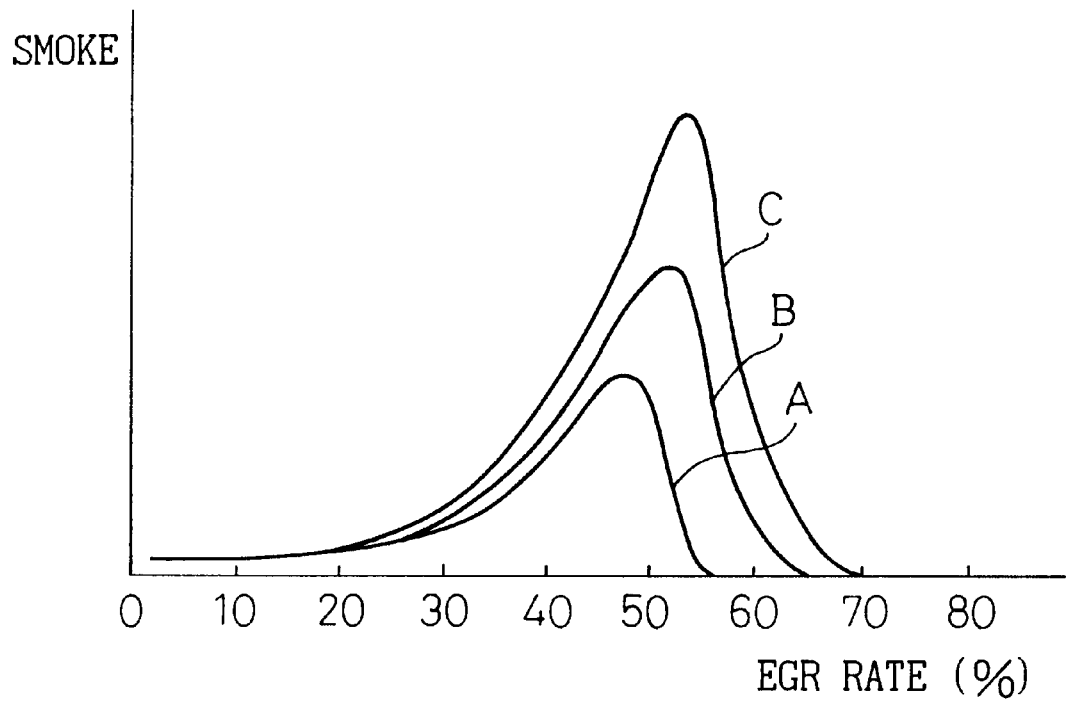

INTERNAL COMBUSTION ENGINE

BACKGROUND OF THE INVENTION

1. Field of the Invention

The present invention relates to an internal combustion engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas + amount of intake air), the lower the combustion temperature in the engine intake passage. When the engine intake passage temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit.

Therefore, it was believed that the EGR rate at which smoke starts to rise sharply was the maximum allowable limit of the EGR rate.

Therefore, in the past, the EGR rate was set within a range not exceeding the maximum allowable limit. The maximum allowable limit of the EGR rate differed considerably according to the type of the engine and the fuel, but was from 30 percent to 50 percent or so. Accordingly, in diesel engines, the EGR rate was suppressed to 30 percent to 50 percent at a maximum.

Since it was believed in the past that there was a maximum allowable limit to the EGR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NOx and smoke continues being produced.

The present inventors, however, discovered in St the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of NOx produced at this time was extremely small. They engaged in further studies later based on this discovery to determine the reasons why soot was not produced and as a result construct a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow.

That is, what was found from repeated experiments and research was that the growth of hydrocarbons into soot stops at a stage before that happens when the temperatures of the fuel and the gas around the fuel at the time of combustion in the engine combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the engine combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily purified by after-treatment using an oxidation catalyst etc. This is the basic thinking behind this new system of combustion.

SUMMARY OF THE INVENTION

An object of the present invention is to provide an internal combustion engine which is operated by a new principle of combustion constituting the basis of a new combustion system.

According to the present invention, there is provided an internal combustion engine in which an amount of production of soot gradually increases and then peaks when an amount of inert gas in a combustion chamber increases, wherein the amount of the inert gas is made larger than an amount of inert gas where the amount of production of soot peaks to make the temperatures of the fuel and gas around the fuel at the time of combustion in the combustion chamber lower than a temperature at which soot is produced, and an after treatment device for purifying unburned hydrocarbons, which are exhausted from the combustion chamber in the form of a precursor of soot or a form before that, is arranged in an engine exhaust passage.

BRIEF DESCRIPTION OF THE DRAWINGS

The present invention may be more fully understood from the description of the preferred embodiments of the invention set forth below together with the accompanying drawings, in which:

FIG. 4 is a view of a fuel molecule;

FIG. 5 is a view of the relationship between the amount of generation of smoke and the EGR rate;

DESCRIPTION OF THE PREFERRED EMBODIMENTS

Figure 1:
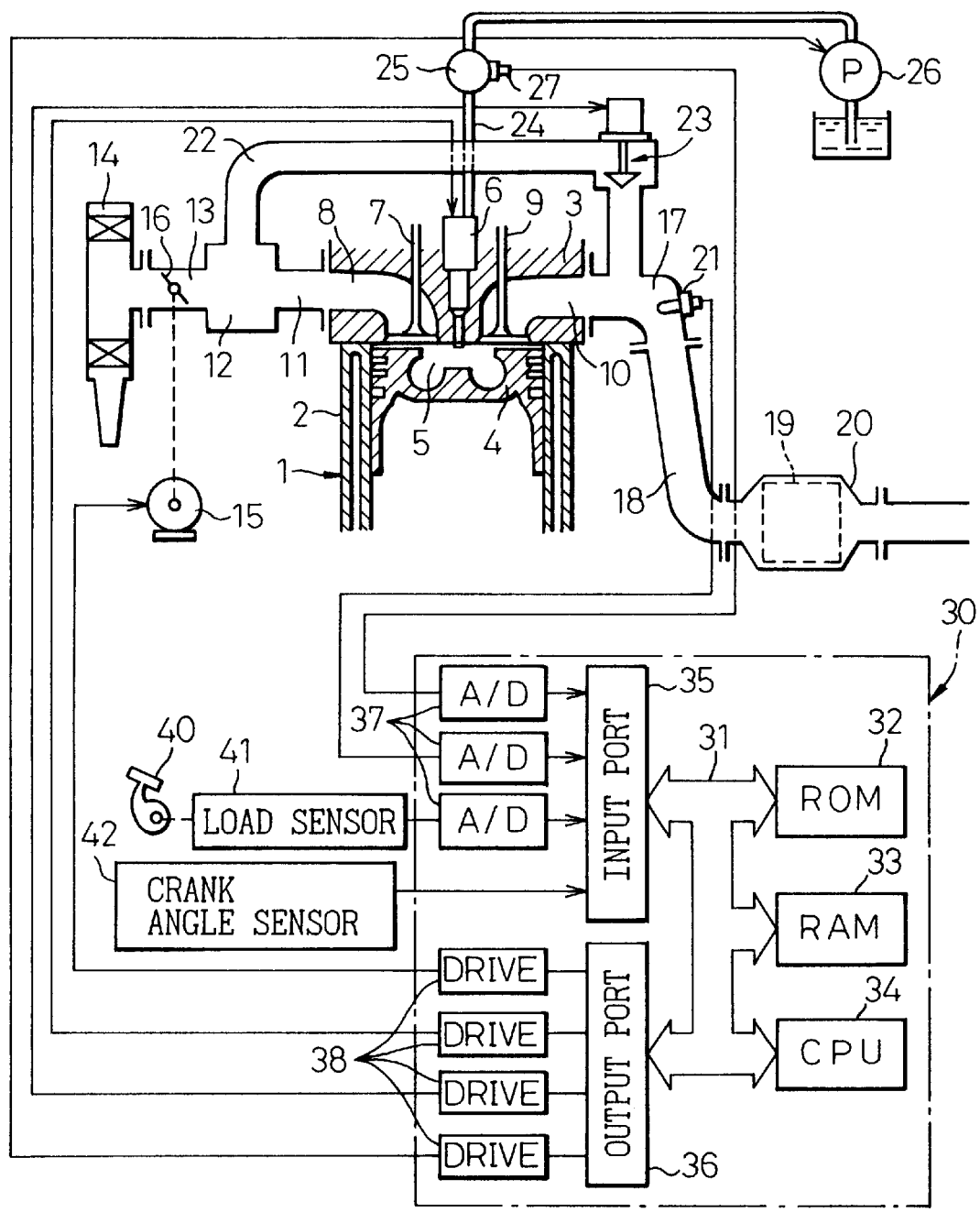
FIG. 1 is an overall view of a compression ignition type internal combustion engine.

FIG. 1 is a view of the case of application of the present invention to a four-stroke compression ignition type internal combustion engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 to an air cleaner 14. A throttle valve 16 driven by an electric motor 15 is arranged in the intake duct 13. On the other hand, the exhaust port 10 is connected through an exhaust manifold 17 and exhaust tube 18 to a catalytic converter 20 housing a catalyst 19 having an oxidation action. An air fuel ratio sensor 21 is arranged in the exhaust manifold 17.

The exhaust manifold 17 and surge tank 12 are connected with each other through an EGR passage 22. An electrically controlled EGR control valve 23 is arranged in an EGR passage 22. Each fuel injector 6 is connected through a fuel supply tube 24 to the fuel reservoir, that is, a common rail 25. Fuel is supplied to the common rail 25 from an electrically controlled variable discharge fuel pump 26. Fuel supplied in the common rail 25 is supplied through each fuel supply tube 24 to the fuel injector 6. A fuel pressure sensor 27 for detecting the fuel pressure in the common rail 25 is attached to the common rail 25. The amount of discharge of the fuel pump 26 is controlled based on the output signal of the fuel pressure sensor 27 so that the fuel pressure in the common rail 25 becomes the target fuel pressure.

The electronic control unit 30 is comprised of a digital computer and is provided with a ROM (read only memory) 32, a RAM (random access memory) 33, a CPU (microprocessor) 34, an input port 35, and an output port 36 connected with each other by a bidirectional bus 31. The output signal of the air fuel ratio sensor 21 is input through a corresponding AD converter 37 to the input port 35. Further, the output signal of the fuel pressure sensor 27 is input through a corresponding AD converter 37 to the input port 35. The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. On the other hand, the output port 36 has connected to it through a corresponding drive circuit 38 the fuel injector 6, electric motor 15, EGR control valve 23, and fuel pump 26.

Figure 2:
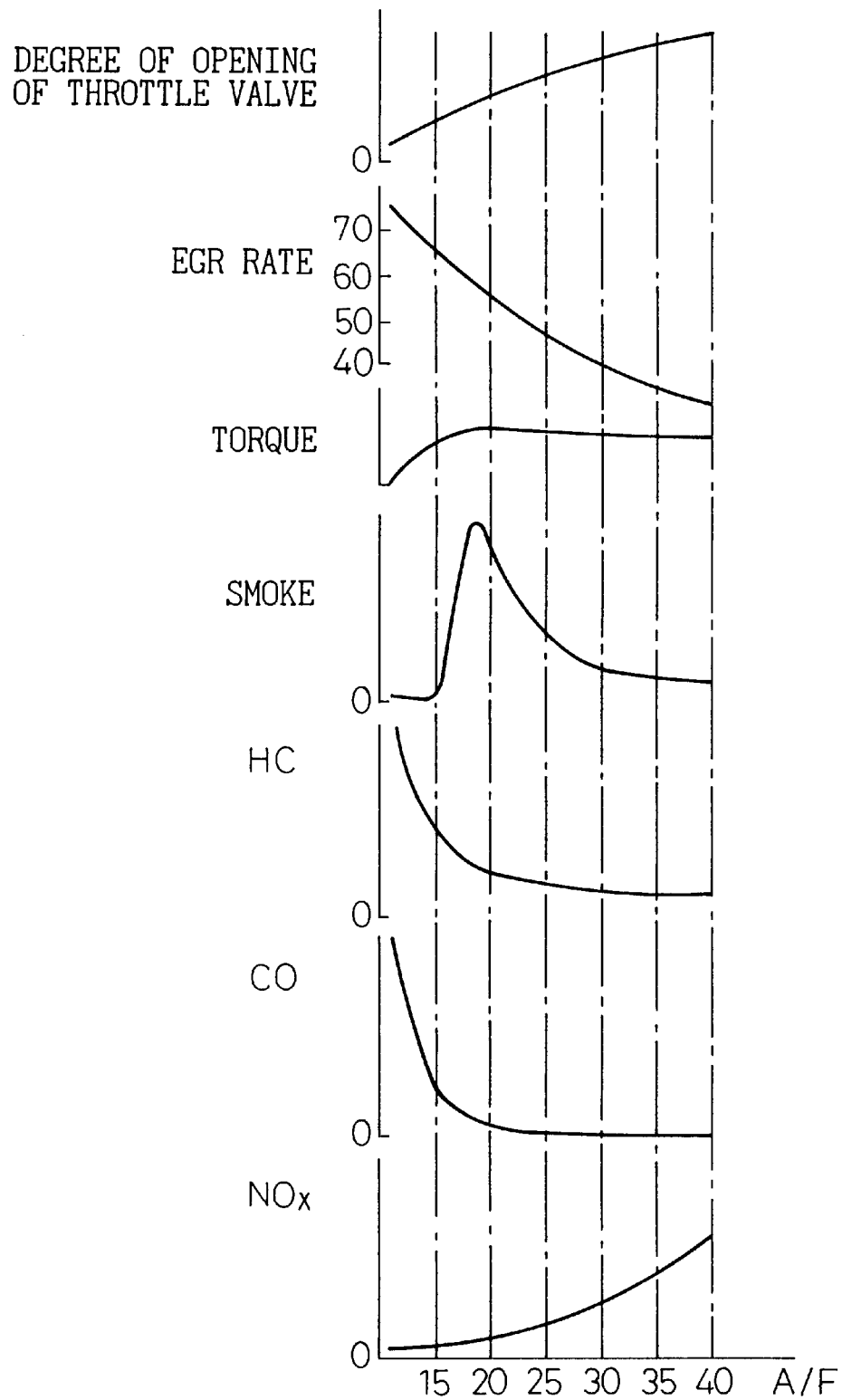
FIG. 2 is a view of the amount of generation of smoke and NOx.

FIG. 2 shows an example of an experiment showing the changes in the output torque, the amount of smoke, HC, CO, and NOx exhausted at that time when changing the air fuel ratio A/F (abscissa in FIG. 2) by changing the opening degree of the throttle valve 16 and the EGR rate at the time of engine low load operation. As will be understood from FIG. 2, in this experiment, the EGR rate becomes larger the smaller the air fuel ratio A/F. When below the stoichiometric air fuel ratio ($\approx$14.6), the EGR rate becomes over 65 percent.

As shown in FIG. 2, if increasing the EGR rate to reduce the air fuel ratio A/F, when the EGR rate becomes close to 40 percent and the air fuel ratio A/F becomes 30 degrees, the amount of smoke produced starts to increase. Next, when the EGR rate is further raised and the air fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 3A:
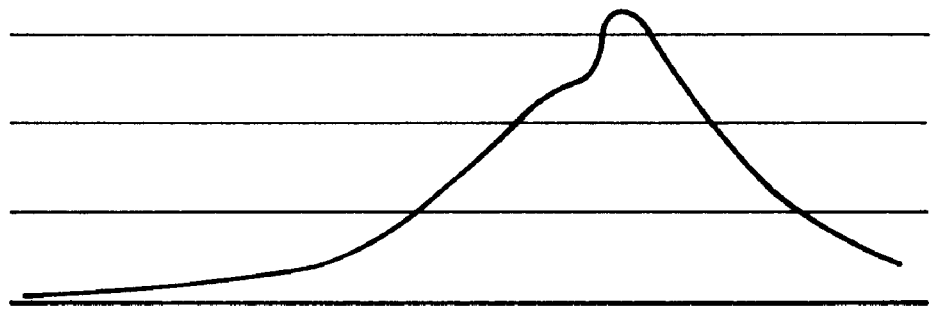
FIGS. 3A and 3B are views of the combustion pressure.
Figure 3B:
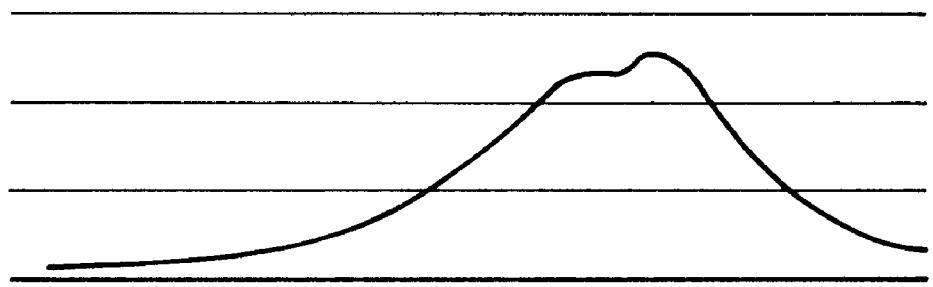

FIG. 3A shows the changes in compression pressure in the combustion chamber 5 when the amount of smoke produced is the greatest near an air fuel ratio A/F of 18. FIG. 3B shows the changes in compression pressure in the combustion chamber 5 when the amount of smoke produced is substantially zero near an air fuel ratio A/F of 13. As will be understood from a comparison of FIG. 3A and FIG. 3B, the compression pressure is lower in the case shown in FIG. 3B where the amount of smoke produced is substantially zero than the case shown in FIG. 3A where the amount of smoke produced is large.

The following may be said from the results of the experiment shown in FIG. 2 and FIGS. 3A and 3B. That is, first, when the air fuel ratio A/F is less than 15.0 and the amount of smoke produced is substantially zero, the amount of NOx produced falls considerably as shown in FIG. 2. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIGS. 3A and 3B. That is, in the state shown in FIG. 3B where almost no soot is produced, the combustion pressure becomes lower, therefore the combustion temperature in the combustion chamber 5 becomes lower at this time.

Second, when the amount of smoke produced, that is, the amount of soot produced, becomes substantially zero, as shown in FIG. 2, the amounts of HC and CO increase. This means that the hydrocarbons are exhausted without growing into soot. That is, the straight chain hydrocarbons and aromatic hydrocarbons contained in the fuel and shown in FIG. 4 decomposes when raised in temperature in an oxygen insufficient state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the engine intake passage. More detailed experiments and studies were conducted on this. As a result, it was learned that when the temperatures of the fuel and the gas around the fuel in the engine combustion chamber 5 are below a certain temperature, the process of growth of soot stops midway, that is, no soot at all is produced and that when the temperature of the fuel and its surroundings in the engine combustion chamber 5 becomes higher than the certain temperature, soot is produced.

The temperature of the fuel and its surroundings when the process of production of hydrocarbons stops in the state of the soot precursor, that is, the above certain temperature, changes depending on various factors such as the type of the fuel, the air fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperature of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the engine combustion chamber 5 in the form of a soot precursor or a state before that or exhausted from the engine combustion chamber 5 in the form of soot. The combustion system according to the present invention is based on the idea of exhausting the hydrocarbons from the engine combustion chamber 5 in the form of a soot precursor or a state before that without allowing the production of soot in the engine combustion chamber 5 and causing the hydrocarbons to oxide by an oxidation catalyst etc.

Now, to stop the growth of hydrocarbons in the state before the production of soot, it is necessary to suppress the temperatures of the fuel and the gas around it at the time of combustion in the engine combustion chamber 5 to a temperature lower than the temperature where soot is produced. In this case, it was learned that the heat absorbing action of the gas around the fuel at the time of combustion of the fuel has an extremely great effect in suppression the temperatures of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, the presence of inert gas plays an important role in the suppression of the combustion temperature. It is possible to lower the combustion temperature by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

FIG. 5 shows the relationship between the EGR rate and smoke when using EGR gas as the inert gas and changing the degree of cooling of the EGR gas. That is, the curve A in FIG. 5 shows the case of strongly cooling the EGR gas and maintaining the temperature of the EGR gas at about 90° C., curve B shows the case of cooling the EGR gas by a compact cooling apparatus, and curve C shows the case of not strongly cooling the EGR gas.

When strongly cooling the EGR gas as shown by the curve A in FIG. 5, the amount of soot produced peaks when the EGR rate is a little under 50 percent. In this case, if the EGR rate is made about 55 percent or higher, almost no soot is produced any longer.

On the other hand, when the EGR gas is slightly cooled as shown by curve B in FIG. 5, the amount of soot produced peaks when the EGR rate is slightly higher than 50 percent. In this case, if the EGR rate is made above about 65 percent, almost no soot is produced any longer.

Further, when the EGR gas is not forcibly cooled as shown by curve C in FIG. 5, the amount of soot produced peaks near an EGR rate near 55 percent. In this case, if the EGR rate is made over about 70 percent, almost no soot is produced any longer.

Note that FIG. 5 shows the amount of smoke produced when the engine load is relatively high. When the engine load becomes smaller, the EGR rate at which the amount of soot produced peaks falls somewhat and the lower limit of the EGR rate at which almost no soot is produced any longer falls somewhat. In this way, the lower limit of the EGR rate at which almost no soot is produced any longer changes in accordance with the degree of cooling of the EGR gas or the engine load.

Figure 6:
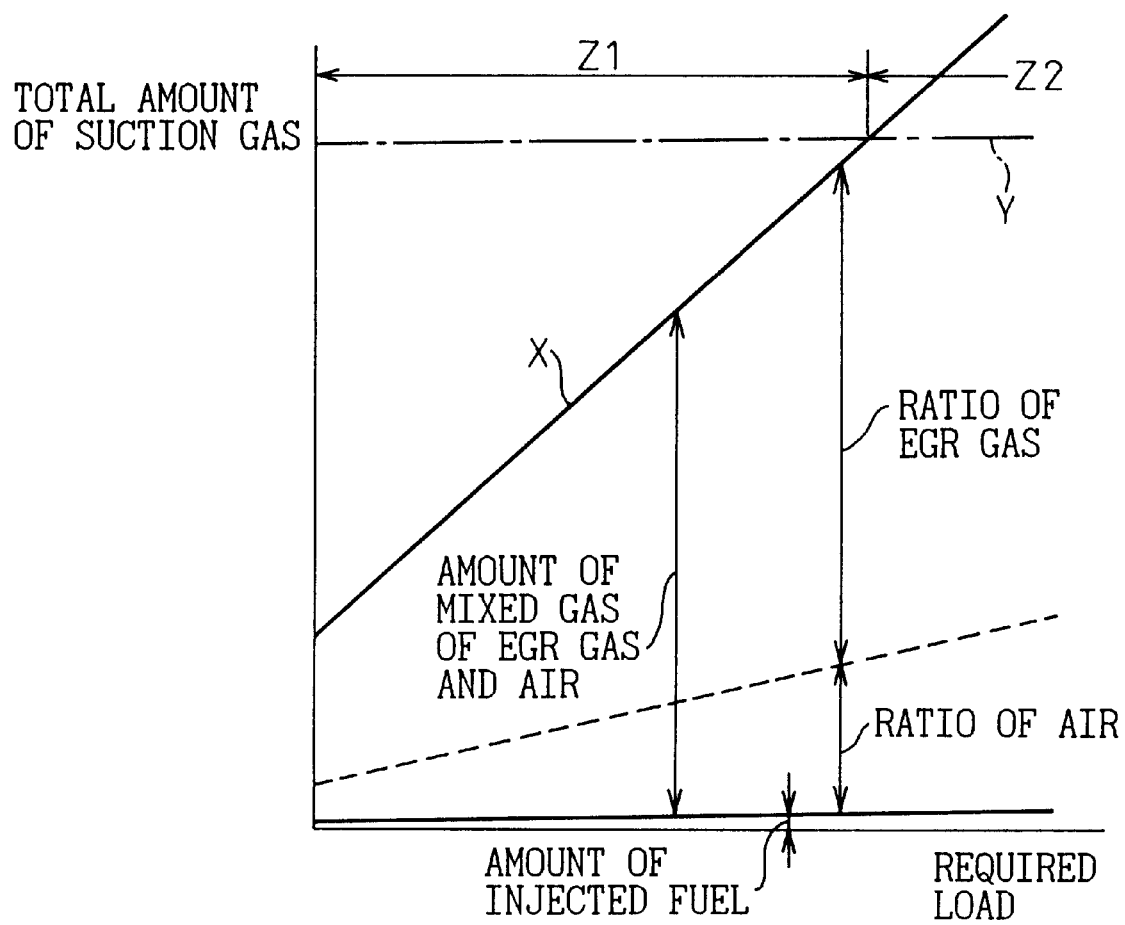
FIG. 6 is a view of the relationship between the amount of injected fuel and the amount of mixed gas.

FIG. 6 shows the amount of mixed gas of EGR gas and air, the ratio of air in the mixed gas, and the ratio of EGR gas in the mixed gas, required for making the temperatures of the fuel and the gas around it at the time of combustion a temperature lower than the temperature at which soot is produced in the case of use of EGR gas as an inert gas. Note that in FIG. 6, the ordinate shows the total amount of suction gas taken into the engine combustion engine 5. The broken line Y shows the total amount of suction gas able to be taken into the engine combustion chamber 5 when supercharging is not being performed. Further, the horizontal axis shows the required load. Z1 shows the low load operating region.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air fuel ratio. On the other hand, in FIG. 6, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, at least 55 percent—in the embodiment shown in FIG. 6, at least 70 percent. That is, if the total amount of suction gas taken into the engine combustion chamber 5 is made the solid line X in FIG. 6 and the ratio between the amount of air and amount of EGR gas in the total amount of suction gas X is made the ratio shown in FIG. 6, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot into the engine combustion chamber 5, it is necessary to supercharge or pressurize both of the EGR gas and the intake air or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air fuel ratio is rich.

As explained above, FIG. 6 shows the case of combustion of fuel at the stoichiometric air fuel ratio. In the low load operating region Z1 shown in FIG. 6, even if the air fuel ratio is made smaller than the amount of air shown in FIG. 6, that is, even if the air fuel ratio is made rich, it is possible to obstruct the production of soot and make the amount of NOx produced around 10 ppm or less. Further, in the low load region Z1 shown in FIG. 6, even if the air fuel ratio is made greater than the amount of air shown in FIG. 6, that is, the mean value of the air fuel ratio is made a lean 17 to 18, it is possible to obstruct the production of soot and make the amount of NOx produced around 10 ppm or less.

That is, when the air fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the mean air fuel ratio is lean or when the air fuel ratio is the stoichiometric air fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the present invention, in the engine low load operating region Z1, despite the air fuel ratio, that is, whether the air fuel ratio is rich or the stoichiometric air fuel ratio or the mean air fuel ratio is lean, no soot is produced and the amount of NOx produced becomes extremely small. Therefore, considering the improvement of the fuel consumption rate, it may be said to be preferable to make the mean air fuel ratio lean.

Figure 7:
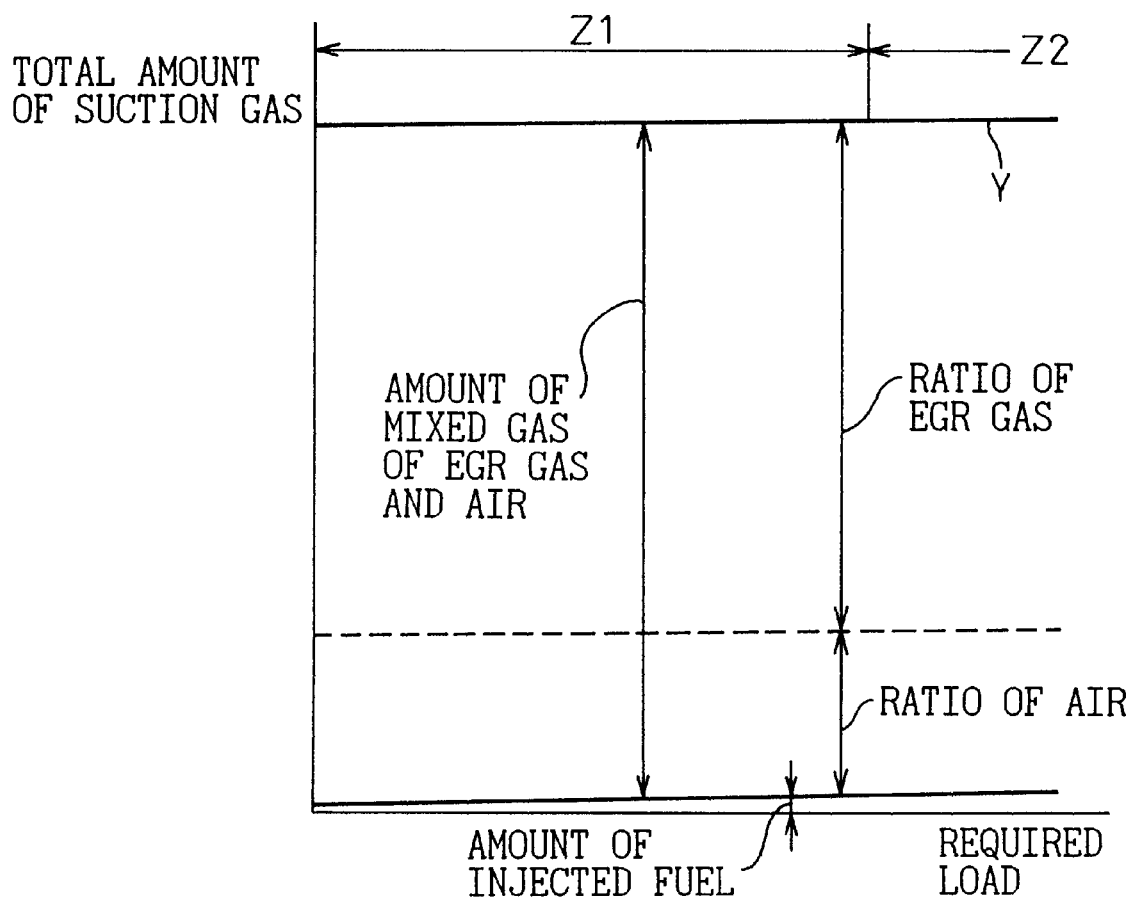
FIG. 7 is a view of the relationship between the amount of injected fuel and the amount of mixed gas.
Figure 8:
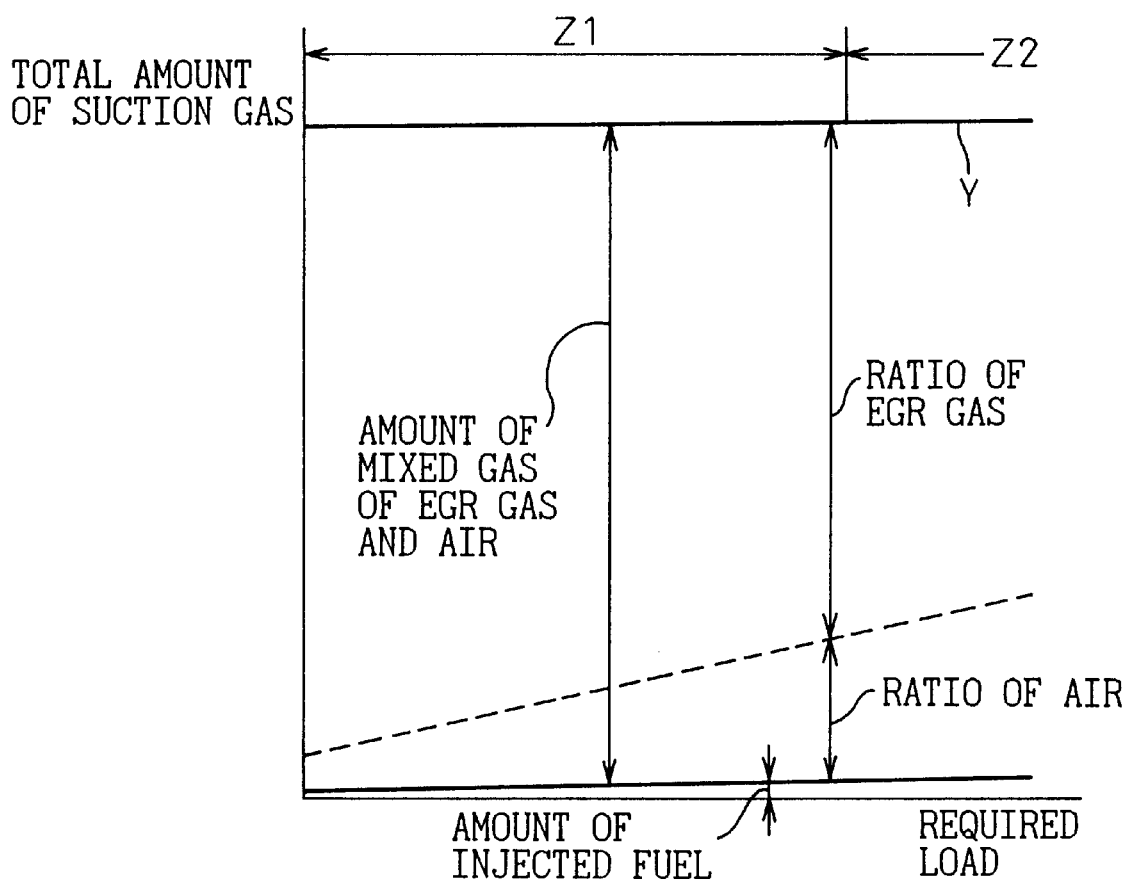
FIG. 8 is a view of the relationship between the amount of injected fuel and the amount of mixed gas.

FIG. 7 and FIG. 8 show the case where the amount of suction gas is made the maximum amount of gas which may be taken into the combustion chamber 5. Note that FIG. 7 shows the case where the EGR rate is maintained at a substantially constant rate of at least 55 percent despite the required load. In this case, the amount of excess air is increased the smaller the required load. On the other hand, FIG. 8 shows the case where the air fuel ratio is held at a predetermined rich air fuel ratio or stoichiometric air fuel ratio or the mean air fuel ratio is maintained at a predetermined lean air fuel ratio regardless of the required load. In this case, the EGR rate is increased the smaller the required load. In this case, however, even when the EGR rate is the lowest, it is at least about 55 percent. No soot at all is produced in any of the cases shown in FIG. 7 and FIG. 8 and the amount of NOx produced is extremely small.

Next, an explanation will be made of a specific example of the control of the operation at the time of engine low load operation referring to FIG. 9 to FIG. 12.

Figure 9:
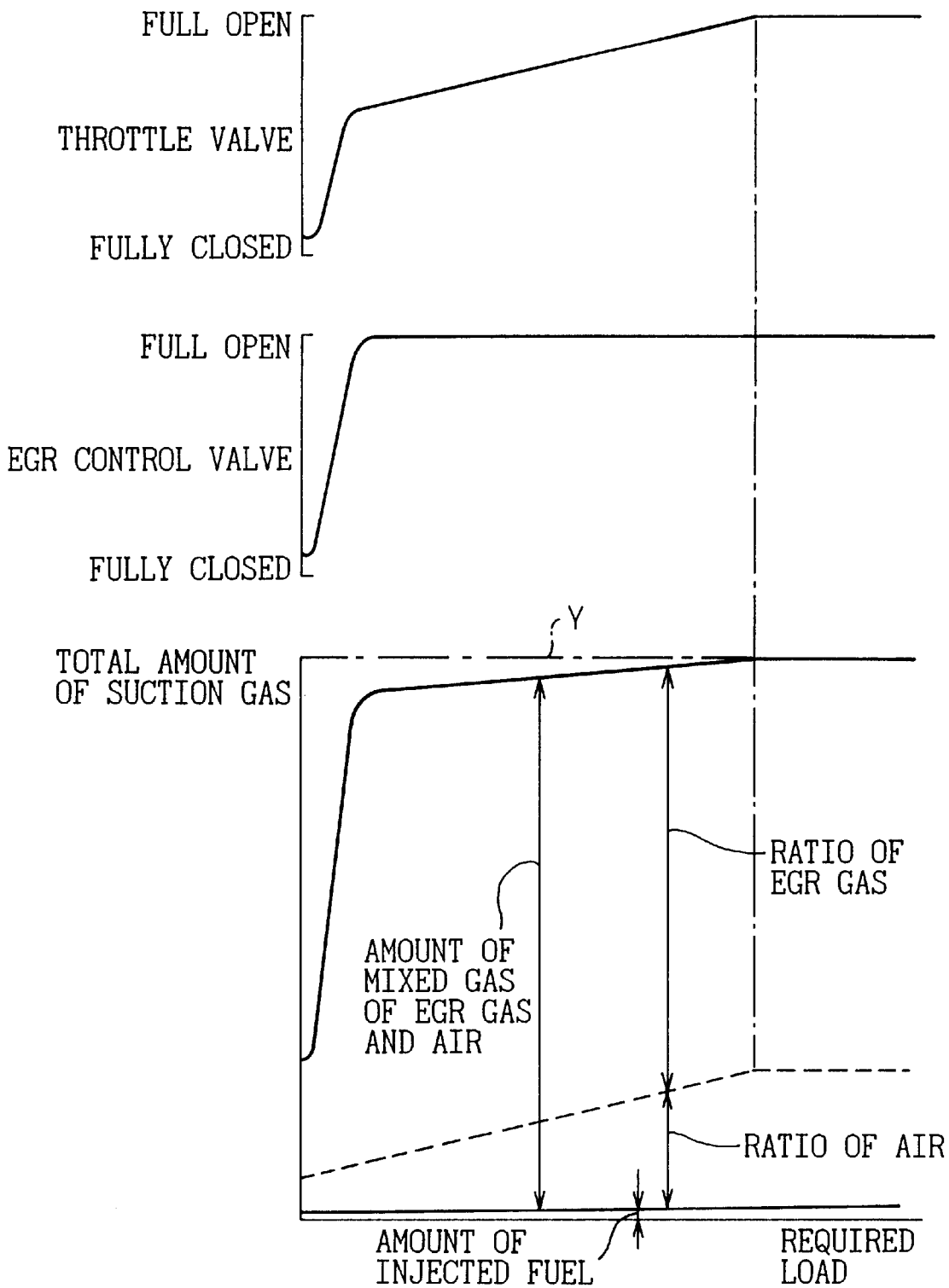
FIG. 9 is a view of the relationship between the amount of injected fuel and the amount of mixed gas.

FIG. 9 shows the amount of injected fuel, the amount of intake air, and the amount of EGR gas with respect to the required load and the opening degrees of the throttle valve 16 (FIG. 1) and the EGR control valve 23 (FIG. 1) for obtaining the amount of intake air and amount of EGR gas. Note that in FIG. 9, Y shows the same value as the Y in FIG. 6. In this example, except when the required load is the lowest, that is, when the engine is idling, the EGR control valve 23 is held at the fully opened state. Except during engine idling, the throttle valve 16 is gradually opened from the half opened state to the fully opened state along with the increase of the required load. When the engine load becomes higher, the normal state of combustion as used in the past is maintained. That is, the throttle valve 16 is fully opened, but the EGR control valve 23 is closed.

As shown in FIG. 9, the throttle valve 16 is closed to close to the fully closed state at the time of engine idling. At this time, the EGR control valve 23 is also closed to close to the fully closed state so as to give the optimal amount of EGR gas in accordance with the required load. When the throttle valve 16 is closed to close to the fully closed state, the pressure in the combustion chamber 5 at the start of the compression becomes lower, so the compression pressure becomes smaller. When the compression pressure becomes smaller, the compression work by the piston 4 becomes smaller, so the vibration of the engine body 1 becomes smaller. That is, at the time of engine idling, the throttle valve 16 is closed to close to the fully closed state so as to suppress the vibration of the engine body 1.

Figure 10A:
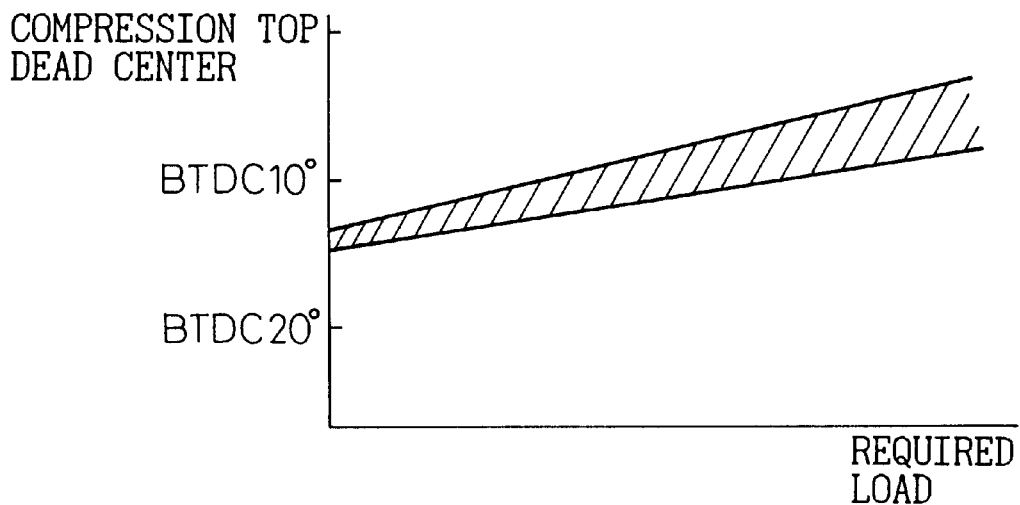
FIGS. 10A and 10B are views of the ignition timing.
Figure 10B:
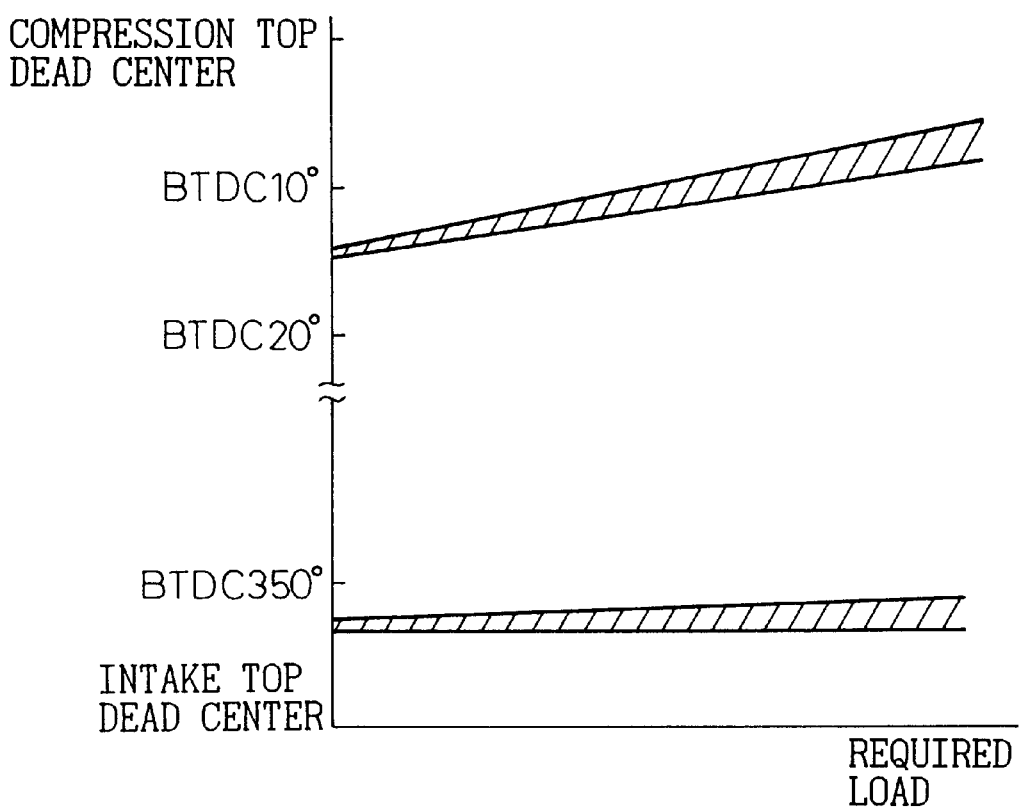

The hatching in FIG. 10A shows the duration of fuel injection from the fuel injector 6. As shown in FIG. 10A, the timing of the start of injection is gradually delayed from about 14 degrees before top dead center BTDC of the compression stroke as the required load becomes higher. Note that as shown in FIG. 10B, it is also possible to inject the fuel divided into two stages: the initial stage of the intake stroke and the end stage of the compression stroke.

Figure 11:
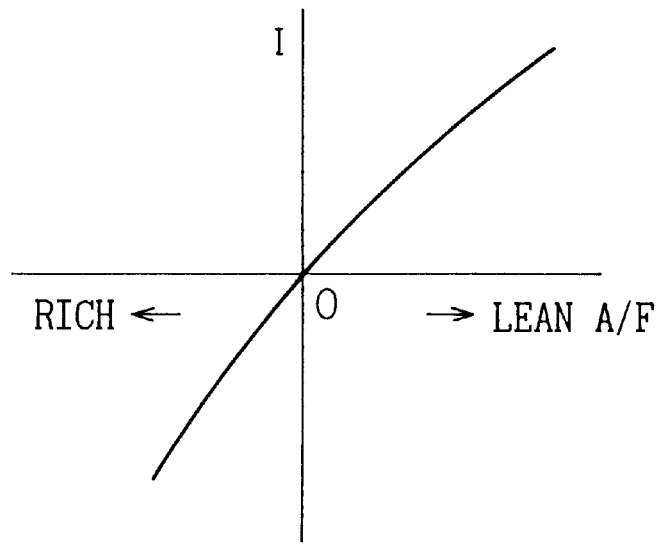
FIG. 11 is a view of the output of the air fuel ratio sensor.

FIG. 11 shows the output of the air fuel ratio sensor 21. As shown in FIG. 11, the output current I of the air fuel ratio sensor 21 changes in accordance with the air fuel ratio A/F. Therefore, it is possible to determine the air fuel ratio from the output current I of the air fuel ratio sensor 21.

Figure 12:
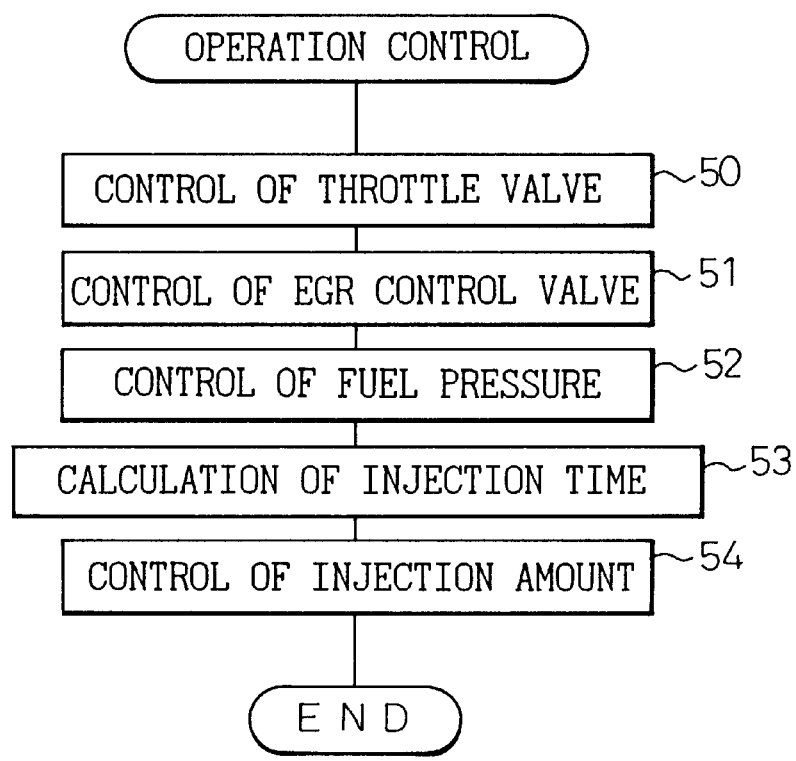
FIG. 12 is a flow chart of the control of the engine operation.

FIG. 12 shows the routine for control of the operation of the engine at the time of low load operation. Referring to FIG. 12, first, at step 50, the throttle valve 16 is controlled to the opening degree shown in FIG. 9. Next, at step 51, the EGR control valve 23 is controlled to the opening degree shown in FIG. 9. Next, at step 52, the fuel pressure in the common rail 25 is controlled to the target fuel pressure based on the output signal of the fuel pressure sensor 27. Next, at step 53, the injection timing is calculated. Next, at step 54, the basic injection amount, determined from the amount of depression of the accelerator pedal 40 and the engine rotational speed, is corrected so that the air fuel ratio becomes the target air fuel ratio based on the output signal of the air fuel ratio sensor 21.

At the time of engine low load operation, no soot at all is produced. Almost no NOx is produced. When the exhaust gas contains a soot precursor or hydrocarbons in the state before that, the hydrocarbons are oxidized by the catalyst 19.

As the catalyst 19, an oxidation catalyst, three-way catalyst, or NOx absorbent can be used. The NOx absorbent has the function of absorbing NOx when the mean air fuel ratio in the combustion chamber 5 is lean and releases the NOx when the mean air fuel ratio in the combustion chamber 5 is rich.

The NOx absorbent is for example comprised of alumina as a carrier and, on the carrier, for example, at least one of potassium K, sodium Na, lithium Li, cesium Cs, and other barium Ba, calcium Ca, and other alkali earths, lanthanum La, yttrium Y, and other rare earths plus platinum Pt or another precious metal.

The oxidation catalyst, of course, and also the three-way catalyst and NOx absorbent have an oxidation function, therefore the three-way catalyst and NOx absorbent can be used as the catalyst 19 as explained above.

Figure 13:
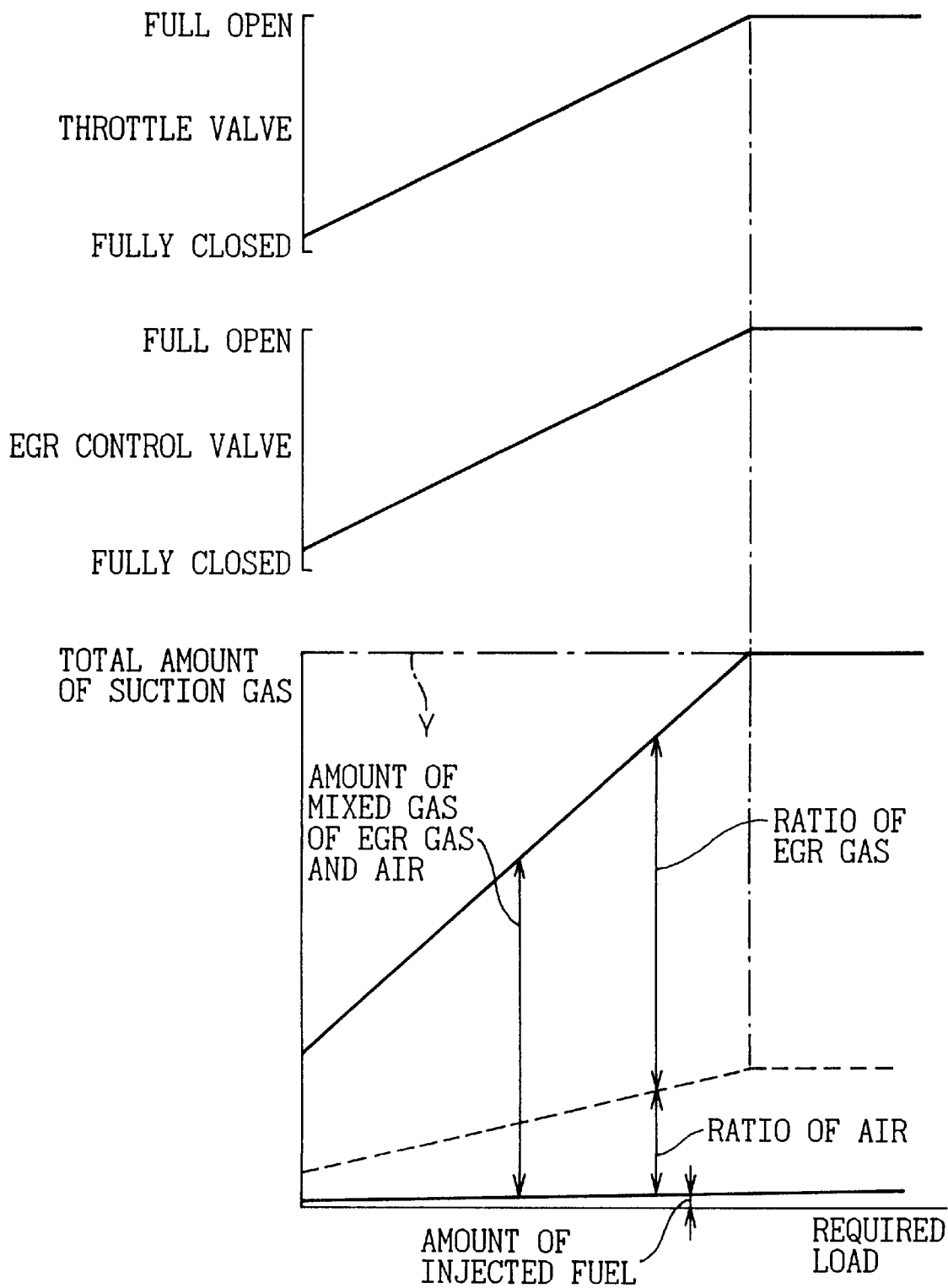
FIG. 13 is a view of the relationship between the amount of injected fuel and the amount of mixed gas.

FIG. 13 shows another specific example of the control of the operation at the time of engine low load operation. In this example, the opening degree of the throttle valve 16 and the opening degree of the EGR control valve 23 are increased along with the increase of the required load so that the amount of intake air and the amount of EGR gas increase along with the increase in the amount of injected fuel.

FIG. 14 to FIG. 19 show various embodiments able to be used to further reduce the amount of soot produced at the time of engine low load operation and able to be used to expand the operating region where the amount of soot produced becomes substantially zero to the high load side.

Figure 14:
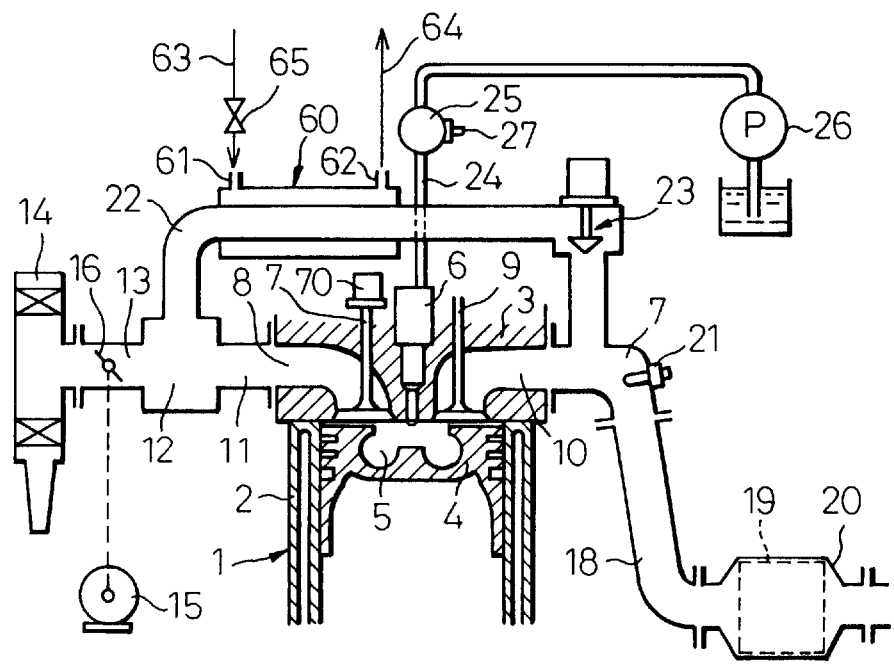
FIG. 14 is an overview of another embodiment of a compression ignition type internal combustion engine.

Referring to FIG. 14, a cooling apparatus 60 is arranged around the EGR passage 22. The cooling apparatus 60 has a cooling water intake port 61 and a cooling water discharge port 62. The cooling water intake port 61 is connected through a cooling water supply passage 63 to the cooling water outlet of a radiator (not shown). The cooling water discharge port 62 is connected through a cooling water discharge passage 64 to for example the inlet of a water pump (not shown). In the cooling water supply passage 63 is arranged a flow control valve 65 for controlling the amount of cooling water supplied to the cooling apparatus 60.

Figure 15:
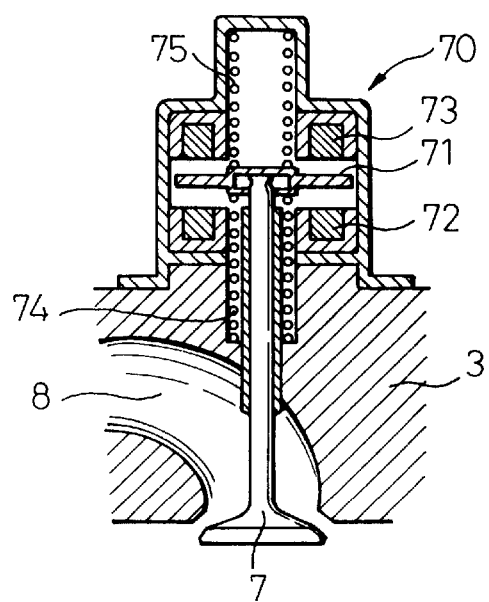
FIG. 15 is a side sectional view of an actuator for driving an intake valve.

Further, the actuator 70 for driving the intake valve is arranged at the top of the intake valve 7. FIG. 15 shows an enlargement of the actuator 70 for driving the intake valve. Referring to FIG. 15, 71 shows a disk-shaped piece of iron attached to the top of the intake valve 7, 72 and 73 solenoids arranged at the two sides of the piece of iron 71, and 74 and 75 compression springs arranged at the two sides of the piece of iron 71. When the solenoid 73 is biased, the piece of iron 71 rises and the intake valve 7 closes. As opposed to this, when the solenoid 72 is biased, the piece of iron 71 falls and the intake valve 7 opens. Therefore, by controlling the timing of biasing of the solenoids 72 and 73, it is possible to open and close the intake valve 7 at any timing.

If dual use is made of the action of reduction of the combustion temperature by another method in addition to the action of reduction of the combustion temperature by the heat absorbing action of the inert gas, for example, the EGR gas, the combustion temperature can be further lowered and therefore soot is further no longer produced. In addition, if the combustion temperature is lowered further in this way, it is possible to expand the operating region where almost no soot is produced to the high load side. In this case, it is necessary to strengthen the action of reduction of the combustion temperature the higher the load, that is, the greater the amount of heat generated at the time of fuel combustion.

Figure 16:
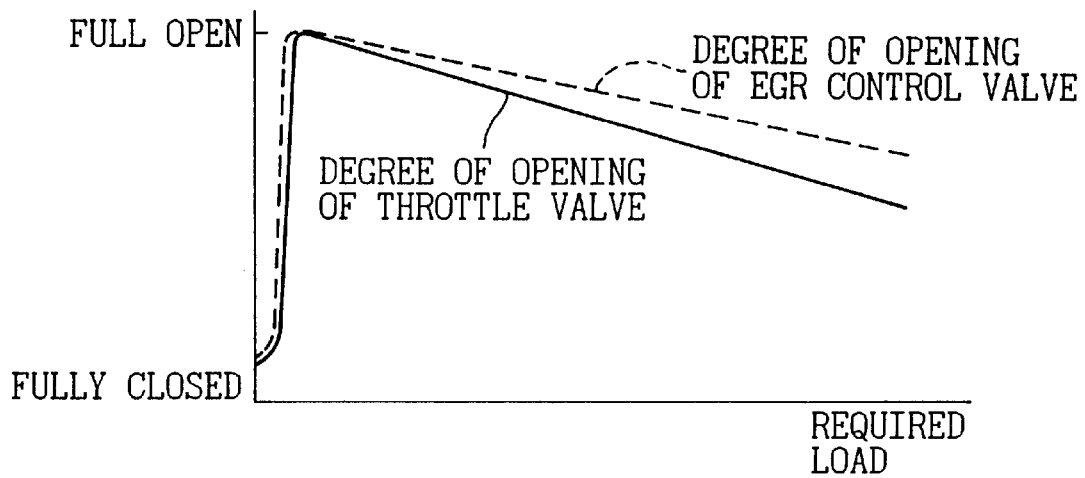
FIG. 16 is a view of the opening degree of a throttle valve etc.

FIG. 16 shows the case of reduction of the combustion temperature by reducing the opening degree of the throttle valve 16. That is, if the opening degree of the throttle valve 16 is reduced, the pressure in the combustion chamber 5 at the start of compression becomes lower, so the pressure in the combustion chamber 5 at the end stage of the compression stroke becomes lower, therefore the combustion temperature becomes lower. Note that in the example shown in FIG. 16, the action of reducing the combustion temperature is strengthened the higher the engine load by reducing the opening degree of the throttle valve 16 as the required load becomes higher except during engine idling.

Figure 17:
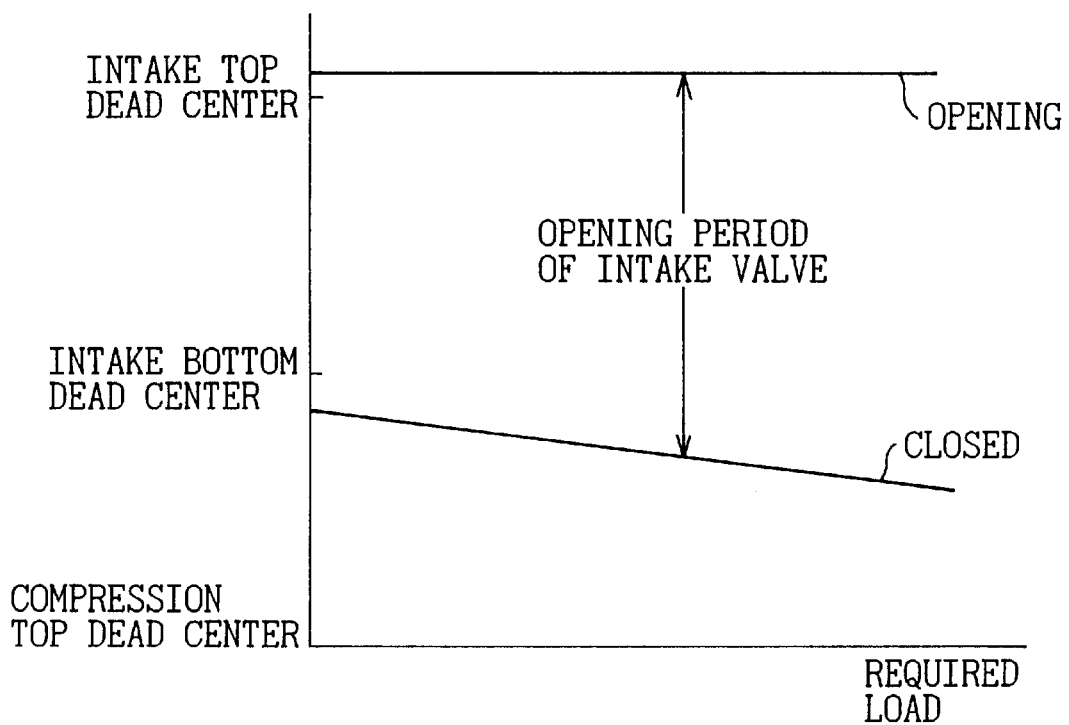
FIG. 17 is a view of the timing of operation of an intake valve.

FIG. 17 shows the case of reduction of the combustion temperature by delaying the timing of closing of the intake valve 7. That is, if the timing of closing of the intake valve 7 is delayed, the real compression ratio becomes smaller and therefore the combustion temperature falls. Note that in the example shown in FIG. 17, the action of reducing the combustion temperature is strengthened the higher the engine load by gradually delaying the timing of closing the intake valve 7 by the actuator 70 the higher the required load. Note that various types of variable compression apparatuses for changing the compression ratio are known. These variable compression apparatuses may be used to reduce the compression ratio the higher the engine load.

Figure 18:
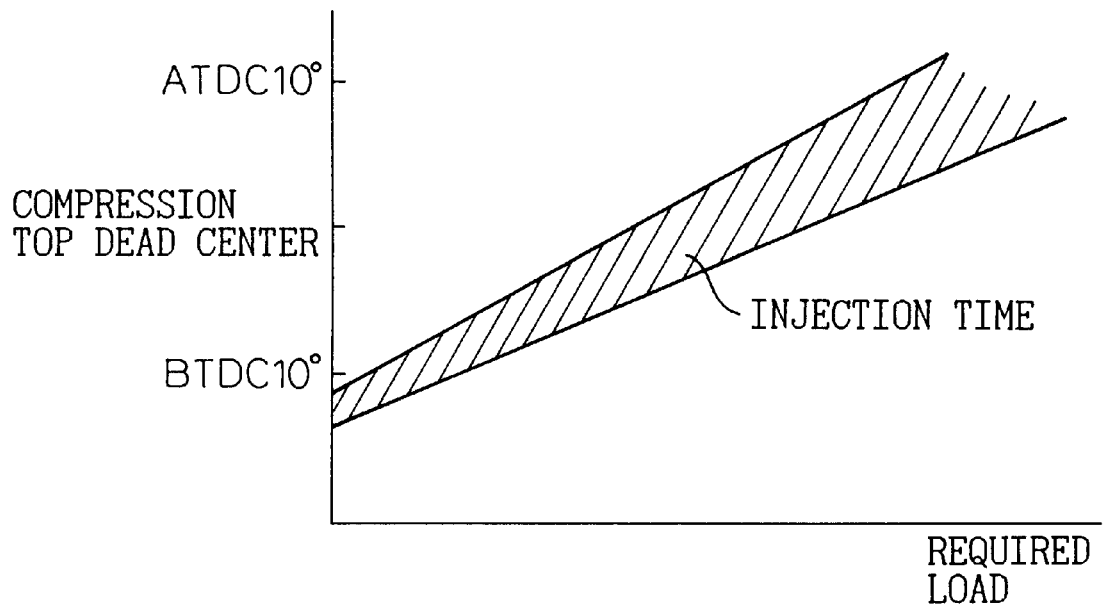
FIG. 18 is a view of the ignition period.

FIG. 18 shows the case of reduction of the combustion temperature by delaying the timing of injection. That is, if the injection timing is brought close to the top dead center of the compression stroke or made after the top dead center of the compression stroke, the combustion pressure falls and the combustion temperature falls. Note that in the example shown in FIG. 18, the action of reducing the combustion temperature is strengthened the higher the engine load by gradually delaying the injection timing from before top dead center of the compression stroke to after top dead center of the compression stroke as the required load becomes higher.

Figure 19:
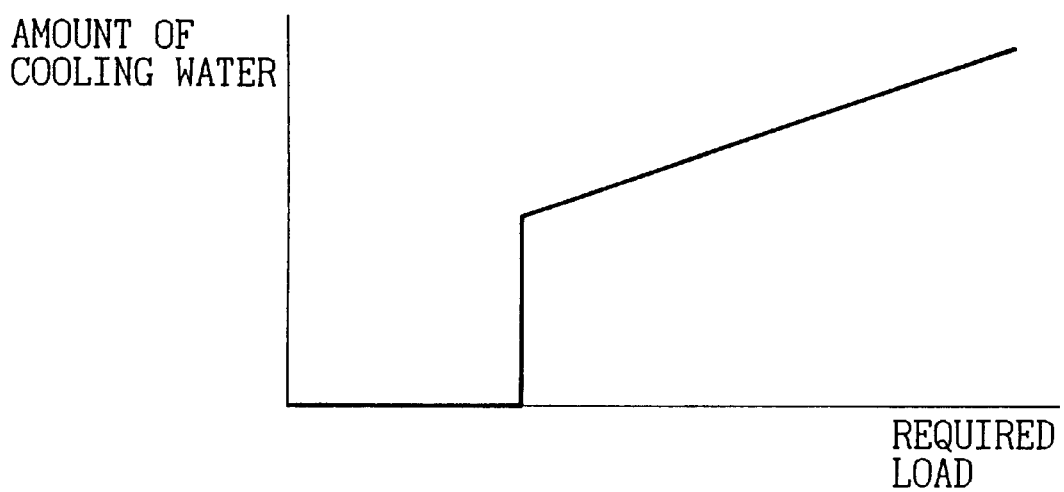
FIG. 19 is a view of the amount of cooling water supplied into a cooling apparatus.

FIG. 19 shows the case of reduction of the combustion temperature by cooling the EGR gas by the cooling apparatus 60. Note that in the example shown in FIG. 19, when the engine load is less than a predetermined load, the cooling action by the cooling apparatus 60 is suspended, while when the engine load becomes a predetermined load or more, the action of reducing the combustion temperature is strengthened the higher the engine load by controlling the flow control valve 65 so that the amount of cooling water supplied to the cooling apparatus increases the higher the required load, that is, the cooling ability of the cooling apparatus 60 becomes higher.

Figure 20:
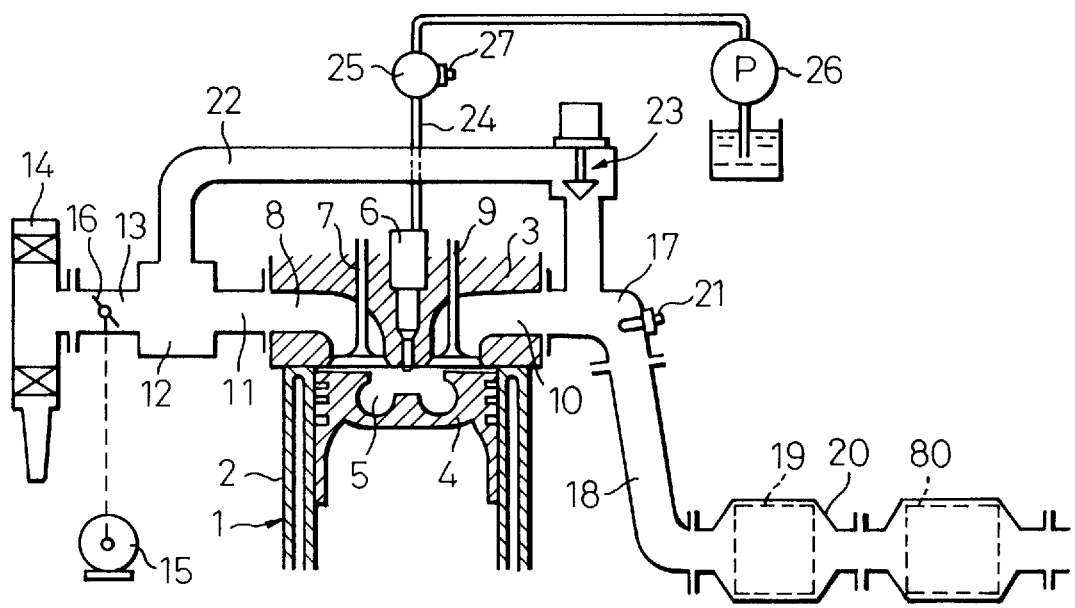
FIG. 20 is an overview of still another embodiment of a compression ignition type internal combustion engine.

Next, an explanation will be made of the case of use of an NOx absorbent as the catalyst 19. Note that as shown in FIG. 20, it is also possible to use an oxidation catalyst as the catalyst 19 and arrange an NOx absorbent 80 in the exhaust passage downstream of the oxidation catalyst 19. If the ratio of the air and the fuel (hydrocarbons) supplied in the engine intake passage, the combustion chamber 5 and exhaust passage upstream of the NOx absorbent 19 (FIG. 1) or 80 (FIG. 20) is called the air fuel ratio of the exhaust gas flowing into the NOx absorbents 19, 80, the NOx absorbents 19, 80 have the action of absorbing and releasing NOx, that is, absorb NOx when the air fuel ratio of the inflowing exhaust gas is lean and release the absorbed NOx when the air fuel ratio of the inflowing exhaust gas is the stoichiometric air fuel ratio or rich.

If NOx absorbents 19, 80 are arranged in the engine exhaust passage, the NOx absorbents 19, 80 have the ability to absorb and release NOx. The detailed mechanism of this absorbing and release action is not clear in portions. This absorbing and release action, however, is believed to be a result of the mechanism shown in FIGS. 21A and 21B. Next, this mechanism will be explained taking as an example the case of carrying platinum Pt and barium Ba on a carrier, but the same mechanism applies even if use is made of another precious metal, alkali or rare earth.

Figure 21A:
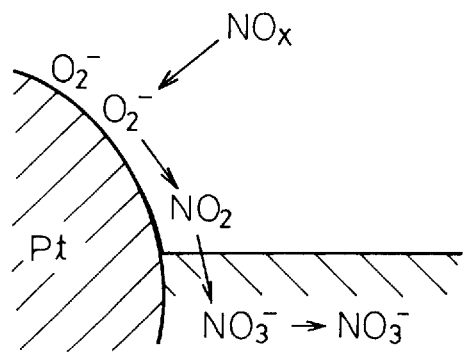
FIGS. 21A and 21B are views for explaining the actions of absorbing and releasing NOx.

In the compression ignition type internal combustion engines shown in FIG. 1 and FIG. 20, combustion is performed in the state of a lean air fuel ratio. When combustion is performed in the state of a lean air fuel ratio in this way, the concentration of oxygen in the exhaust gas is high. At this time, as shown in FIG. 21A, the oxygen $O_2$ adheres to the surface of the platinum Pt in the form of $O_2^-$ or $O^{2-}$. On the other hand, the NO in the inflowing exhaust gas reacts with the $O_2^-$ or $O^{2-}$ to become $NO_2$ ($2NO+O_2 \rightarrow 2NO_2$). Next, part of the $NO_2$ produced is oxidized on the platinum Pt and absorbed in the absorbents and bonds with the barium oxide BaO while diffusing in the absorbents in the form of nitrate ions $NO_3^-$ as shown in FIG. 21A. The NOx is absorbed in the absorbents 19, 80 in this way. So long as the concentration of oxygen in the inflowing exhaust gas is high, $NO_2$ is produced on the surface of the platinum Pt. So long as the absorbents to absorb NOx are not saturated, $NO_2$ is absorbed in the absorbents and nitrate ions $NO_3^-$ are produced.

Figure 21B:
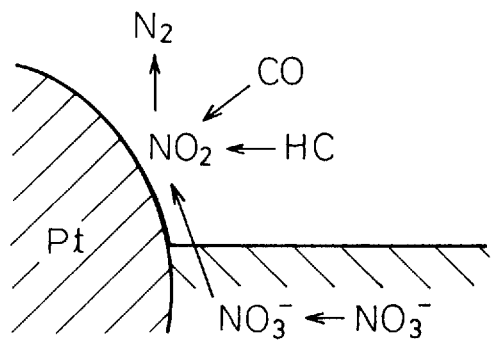

On the other hand, at the time of engine low load operation, the combustion temperature is lowered to prevent the production of soot. At this time, the air fuel ratio is made rich. When the air fuel ratio is made rich, the concentration of oxygen in the inflowing exhaust gas falls, and the amount of production of NOx falls, the reaction proceeds in the reverse direction ($NO_3^- \rightarrow NO_2$), therefore, the nitrate ions $NO_3^-$ in the absorbent are released from the absorbent in the form of $NO_2$. At this time, the $NO_x$ released from the NOx absorbents 19, 80 is reduced by reacting with the large amount of unburned HC and CO contained in the inflowing exhaust gas as shown in FIG. 21B. When there is no longer any $NO_2$ on the surface of the platinum Pt in this way, $NO_2$ is successively released from the absorbents. Therefore, when the air fuel ratio is made rich, the NOx is released from the NOx absorbents 19, 80 in a short time and, further, the released NOx is reduced, so it is possible to prevent the exhaust of NOx into the atmosphere.

In this way, in this embodiment, the action of the NOx absorbents 19, 80 in absorbing and releasing NOx is used to inhibit the release of NOx into the atmosphere. Further, even when the air fuel ratio is made rich at the time of engine low load operation so as to release NOx from the NOx absorbents 19, 80, almost no soot is produced.

Note that it is also possible to make the air fuel ratio at the time of low load operation somewhat lean and make the air fuel ratio rich only when releasing the NOx from the NOx absorbents 19, 80. Note that since the NOx absorbents 19, 80 also have the functions of reduction catalysts, so the NOx released from the NOx absorbents 19, 80 is reduced even when the air fuel ratio is made the stoichiometric air fuel ratio when NOx is to be released. When the air fuel ratio is made the stoichiometric air fuel ratio, however, NOx is released only gradually from the NOx absorbents 19, 80, so it takes somewhat of a long time to release all of the NOx absorbed in the NOx absorbents 19, 80.

Above, an explanation was made of the case of application of the present invention to a compression ignition type internal combustion engine, but it is also possible to apply the present invention to a gasoline engine.

In this way, according to the present invention, it becomes possible to simultaneously prevent the generation of soot and NOx.

While the invention has been described by reference to specific embodiments chosen for purposes of illustration, it should be apparent that numerous modifications could be made thereto by those skilled in the art without departing from the basic concept and scope of the invention.

We claim:

1. An internal combustion engine in which an amount of soot produced gradually increases and then peaks, the internal combustion engine comprising:

at least one combustion chamber in which a mixture of inert gas, air and fuel are combusted, the soot produced increasing and peaking when an amount of the inert gas in the mixture increases;

means for mixing the inert gas and the air to provide a gas mixture, an engine exhaust passage; and an after treatment device arranged in the engine exhaust passage that purifies unburned hydrocarbons exhausted from the at least one combustion chamber, wherein the amount of the inert gas is made larger than an amount of inert gas where the amount of soot produced peaks to reduce the temperatures of the fuel and the gas mixture at the time of combustion in the at least one combustion chamber lower than a temperature at which the soot is produced, the after treatment device purifies the unburned hydrocarbons exhausted in a form of a precursor of soot or a form before that.

2. The internal combustion engine as set forth in claim 1, wherein the temperatures of the fuel and the gas mixture at the time of combustion in the combustion chamber are temperatures at which the amount of NOx in the exhaust gas becomes around 10 ppm or less.

3. The internal combustion engine as set forth in claim 1, wherein the temperatures of the fuel and the gas mixture at the time of combustion in the combustion chamber are made temperatures lower than the temperature at which soot is produced only when the engine load is lower than a predetermined load.

4. The internal combustion engine as set forth in claim 1, wherein said after treatment device comprises of a catalyst having an oxidation function for oxidizing the unburned hydrocarbons exhausted from the at least one combustion chamber.

5. The internal combustion engine as set forth in claim 4, wherein the catalyst comprises of at least one of the group of an oxidation catalyst, a three-way catalyst, and an NOx absorbent.

6. The internal combustion engine as set forth in claim 1, wherein the heat of combustion of the fuel is mainly absorbed by the inert gas in the combustion chamber and the amount of inert gas is preset so that the temperatures of the fuel and the gas mixture at the time of combustion at least one combustion chamber become temperatures lower than the temperature at which soot is produced.

7. The internal combustion engine as set forth in claim 1, wherein the majority of the inert gas is fed into the at least one combustion chamber at an time of the intake stroke.

8. The internal combustion engine as set forth in claim 7, further comprising:
an engine intake passage; and
an exhaust gas recirculation apparatus that recirculates the exhaust gas exhausted from the at least one combustion chamber into the engine intake passage and the majority of the inert gas is comprised of recirculated exhaust gas recirculated in the engine intake passage.

9. The internal combustion engine as set forth in claim 8, wherein the exhaust gas recirculation rate is at least about 55 percent.

10. The internal combustion engine as set forth in claim 1, wherein an air fuel ratio in the at least one combustion chamber is made a stoichiometric air fuel ratio, a lean air fuel ratio slightly leaner than the stoichiometric air fuel ratio, or a rich air fuel ratio.

11. The internal combustion engine as set forth in claim 1, further comprising a combustion temperature controlling means for maintaining the temperatures of the fuel and the gas mixture at the time of combustion in the at least one combustion chamber at a temperature lower than the temperature at which soot is produced regardless of the amount of fuel fed into the at least one combustion chamber when the engine load is lower than a predetermined load.

12. The internal combustion engine as set forth in claim 11, further comprising:
an engine intake passage; and
an engine exhaust passage; and
the combustion temperature controlling means comprises an exhaust gas recirculation apparatus which recirculates exhaust gas exhausted from the engine exhaust passage into the engine intake passage and the amount of recirculated exhaust gas recirculated in the engine intake passage is increased the more the amount of fuel fed into the at least one combustion chamber increases.

13. The internal combustion engine as set forth in claim 11, further comprising:
an engine intake passage; and
an engine exhaust passage; and
the combustion temperature controlling means comprises a cooling apparatus for a recirculated exhaust gas recirculated into the engine intake passage from the engine exhaust passage and a cooling capacity of the cooling apparatus is increased as the amount of fuel fed into the combustion chamber increases.

14. The internal combustion engine as set forth in claim 11, wherein the combustion temperature controlling means controls a compression ratio of the engine and the compression ratio of the engine is made lower as the fuel fed into the combustion chamber increases.

15. The internal combustion engine as set forth in claim 11, wherein the combustion temperature controlling means is comprises of an intake control valve arranged in the engine intake passage and an opening degree of the intake control valve is made lower as the fuel fed into the combustion chamber increases.

16. The internal combustion engine as set forth in claim 11, further comprising an intake valve in the at least one combustion chamber, the combustion temperature controlling means comprises an actuator for driving the intake valve and a timing of opening of the intake valve is made later by the actuator as the fuel fed into the combustion chamber increases.

17. The internal combustion engine as set forth in claim 11, wherein the combustion temperature controlling means controls a timing of injection of fuel into the combustion chamber and the timing of injection of the fuel is made an end stage of a compression stroke when the amount of fuel fed into the at least one combustion chamber is small and is made later as the amount of fuel fed into the combustion engine increases.

18. The internal combustion engine as set forth in claim 1, further comprising a NOx absorbent which absorbs the NOx contained in an exhaust gas when an air fuel ratio of an inflowing exhaust gas is lean and releases the absorbed NOx when the air fuel ratio of the inflowing exhaust gas is a stoichiometric air fuel ratio or rich is arranged in the engine exhaust passage and the temperatures of the fuel and the gas mixture at the time of combustion in the at least one combustion chamber are made temperatures lower than the temperature at which soot is produced in an engine low load operating state and an air fuel ratio in the combustion chamber is made the stoichiometric air fuel ratio or rich when NOx is to be released from the NOx absorbent.

19. The internal combustion engine as set forth in claim 18, wherein an oxidation catalyst is arranged in the engine exhaust passage upstream of the NOx absorbent.

20. The internal combustion engine as set forth in claim 1, wherein the internal combustion engine comprises a diesel engine and fuel is injected toward the inside of the at least one combustion chamber at least at an end stage of a compression stoke.

21. The internal combustion engine as set forth in claim 20, wherein fuel is injected toward the inside of the at least one combustion chamber in an initial stage of an intake stroke in addition to the end stage of the compression stroke.

* * * * *